C. N. McCLINTOCK.
ROPE SHIPPING HALTER.
APPLICATION FILED DEC. 15, 1919.
1,374,087.
Patented Apr. 5, 1921.
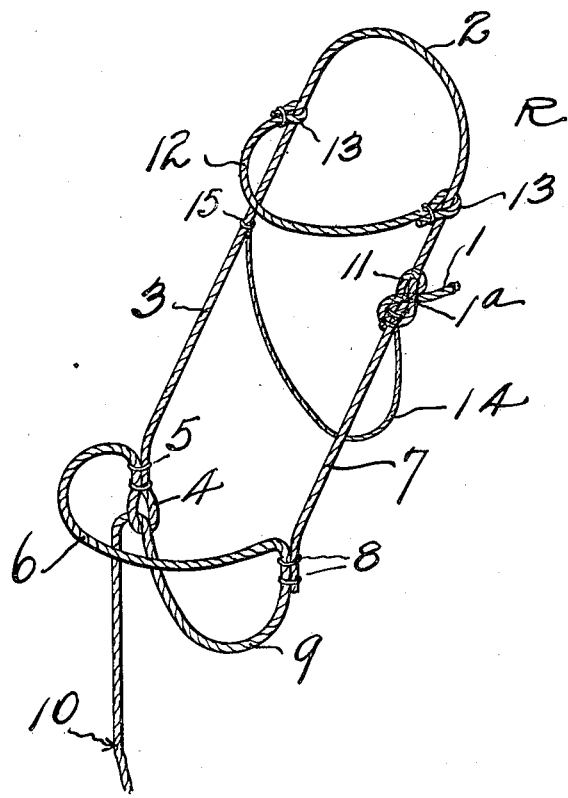
Inventor
Chas. N. McClintock
By
Attorney

UNITED STATES PATENT OFFICE.

CHARLES N. McCLINTOCK, OF ELWOOD, INDIANA, ASSIGNOR TO H. M. MANUFACTURING COMPANY, OF ELWOOD, INDIANA, A CORPORATION OF INDIANA.

ROPE SHIPPING-HALTER.

1,374,087.   Specification of Letters Patent.   Patented Apr. 5, 1921.

Application filed December 15, 1919. Serial No. 344,968.

*To all whom it may concern:*

Be it known that I, CHARLES N. McCLINTOCK, citizen of the United States, residing at Elwood, in the county of Madison and State of Indiana, have invented certain new and useful Improvements in Rope Shipping-Halters, of which the following is a specification.

This invention relates to animal restraining devices and has particular reference to an improvement in halters for horses and other live stock.

To this end the invention contemplates what is termed a shipping halter that is used in the handling and transportation of horses and other animals, and must therefore be cheap and efficient while at the same time readily adaptable to the different head sizes of the animals. In this connection it is proposed to provide a halter made entirely of rope which may be formed in a simple and expeditious manner and fitted with facility on the head of the animal.

A further and more specific object of the invention is to provide a novel knot or tie in one of the cheek ropes of the device that makes it possible to dispense with the use of a buckle or special fitting, and because of the ease with which it may be tied and released, enables the halter to be quickly adjusted to meet the head size of the animal.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

The figure is a perspective view of the rope halter showing my new improvement.

In carrying the present invention into effect it is proposed to utilize a single length of rope as far as possible, and therefore as will be seen from the drawing it is proposed to employ a main rope R of suitable gage or thickness, and whose free end 1 constitutes a tie-end as will hereinafter be more fully explained, while the remainder of the rope is looped or formed in such a manner as to provide the head stall 2, and one of the cheek ropes 3. The continuation of the rope R from the cheek portion 3 is effected in such a manner that an eye 4 is provided at the lower end of the cheek rope by doubling the rope back upon itself and holding it together by the staples or their equivalent 5. The said main piece of rope R may then be led at substantially right angles to the cheek portion 3 to form the nose loop 6 and after having the opposite separate cheek rope 7 attached thereto as indicated at 8 may be looped in such a manner as to provide the chin strap 9 by threading the free end 10 through the loop or eye 4 to thereby leave the said free end for hitching or holding purposes.

In connection with the cheek rope 7 which is attached to the main rope R as at 8 it is to be observed that the upper end thereof is formed with an eye 11 for coöperating with the free end 1 of the rope R to thereby fasten the halter on the animal. That is to say, the upper end of the separate cheek rope 7 is provided with an eye which may receive the free end of the rope R from its inner side whereby the said end 1 may be then passed between the rope 7 and the cheek of the animal and thence forwardly around the outer face of the rope 7 and beneath the portion 1ᵃ of the rope end which leads out of the eye 11. This arrangement provides for making a quick knot and at the same time adjusts the size of the halter to the head of the animal by taking up on the head stall to bring it closer to the nose loop, or vice versa, as the case may be. This type of knot furthermore, tightens upon the tugging of the animal when he is held by the hitching of the rope and thereby provides a very effective tie or knot. At the same time by reason of the free end of the rope being exposed at the outer side of the cheek of the animal the knot may be readily untied by pushing the free end back to clear the portion 1ᵃ of the rope previously referred to.

As shown the halter may be equipped with a brow band 12 which may be fitted to the upper ends of the cheek rope as indicated at 13 so that the same will be relatively adjustable to correspond with adjustments made in the head stall. Further the underside of the halter may be equipped with a throat latch 14 that may be connected by the fastenings 15 to the sides of the cheek rope.

From the foregoing it will be apparent that the present invention provides a halter, that for the great part is made of a single piece of rope whose free ends may be readily utilized as tie and hitching ends while the intermediate part forms one of the cheek portions, head stall, and nose and chin straps. And, another distinctive feature of the device is the knot formed by the end 1 and eye 11 which enables the head stall to be altered to meet the different head sizes of animals. Furthermore, the entire device provides simple, practical and cheap shipping halter which meets all of the requirements of its use.

Accordingly, without further description it is thought that the many features and advantages of the invention are readily apparent.

I claim:—

1. In a halter, a continuous rope forming one of the cheek straps, the head stall and an adjustable nose loop, a separate rope secured to the nose loop and constituting the other cheek strap and provided with an eye for receiving the free end of the continuous rope which completes the head stall, a brow band adjustably attached to the head stall portion of the continuous rope, and a throat latch permanently secured to the cheek straps.

2. A halter including a continuous rope having the free ends thereof providing adjustable tie and hitching ends while the intermediate portion thereof is formed into a head stall, cheek strap, and nose loop, a separate rope constituting the opposite cheek strap attached to one side of the nose loop and having an eye for receiving the free end of the continuous rope forming the head stall.

3. A rope shipping halter including a continuous rope forming a cheek portion and another cheek rope formed with an eye for receiving the free end of the rope which constitutes the other cheek portion, whereby said free end of the rope may be threaded through the eye from the inside and thence led back of the eye and threaded beneath the end of the rope passing through the eye.

4. A rope shipping halter consisting of a main rope arranged to form a cheek portion and head stall, the free end of the head stall portion constituting a tie end and the lower end of the cheek portion being formed into a loop and thence being led at substantially right angles to the cheek portion to provide the upper side of the nose loop, a cheek rope attached to the nose loop and having an eye at its upper end for coöperating with the free end of the head stall portion of the main rope, and the portion of the main rope beyond the point of attachment with the separate cheek rope being looped back through the eye formed at the end of the cheek portion of the main rope to provide an adjustable chin strap and free hitching end.

In testimony whereof I hereunto affix my signature in the presence of two witnesses.

CHARLES N. McCLINTOCK.

Witnesses:
T. SYLVEY HAWKINS,
WM. H. HARMON.